United States Patent

Becker et al.

[11] Patent Number: 5,094,511
[45] Date of Patent: Mar. 10, 1992

[54] ANTI-SKID APPARATUS FOR A VEHICLE BRAKE SYSTEM

[75] Inventors: Rolf Becker, Ditzingen; Wolf-Dieter Jonner, Beilstein Schmidhausen; Reinhard Gutzeit, Stuttgart, all of Fed. Rep. of Germany

[73] Assignee: Robert Bosch GmbH, Stuttgart, Fed. Rep. of Germany

[21] Appl. No.: 606,271

[22] Filed: Oct. 31, 1990

[30] Foreign Application Priority Data

Nov. 6, 1989 [DE] Fed. Rep. of Germany ....... 3936850

[51] Int. Cl.⁵ .............................................. B60T 8/32
[52] U.S. Cl. ................................ 303/116 R; 303/68;
303/119 R; 303/DIG. 6; 303/115 PP; 188/344
[58] Field of Search ............... 303/116, 119, 113, 115,
303/68, 69, 100, 110, 105, DIG. 3, DIG. 4, 87,
84.1, 84.2, 116 R, 116 SP, 116 WP, 116 PC, 119
R, 119 SV, 113 R, 113 TR; 188/344, 181 R, 181 A

[56] References Cited

U.S. PATENT DOCUMENTS

| 4,395,073 | 7/1983 | Arikawa et al. | |
| 4,453,782 | 6/1984 | Arikawa et al. | |
| 4,618,189 | 10/1986 | Nakanishi et al. | 303/116 |
| 4,703,979 | 11/1987 | Nakanishi et al. | 303/116 |
| 4,861,116 | 8/1989 | Bernhardt et al. | 303/116 X |
| 4,964,680 | 10/1990 | Nokubo et al. | 303/115 PP |
| 5,004,301 | 4/1991 | Yamada et al. | 303/115 PP |

FOREIGN PATENT DOCUMENTS 3107963 1/1982 Fed. Rep. of Germany .
3147149 10/1982 Fed. Rep. of Germany .

Primary Examiner—Douglas C. Butler
Attorney, Agent, or Firm—Edwin E. Greigg; Ronald E. Greigg

[57] ABSTRACT

An anti-skid apparatus having a valve, which is embodied to form a pressure limiting device between the outlet of a return pump and a master brake cylinder. As a consequence, a high-pressure reservoir can be of smaller capacity and can therefore be less expensive, since the pressure limiting device protects the pressure reservoir and other hydraulic elements from a pressure overload.

4 Claims, 3 Drawing Sheets

ANTI-SKID APPARATUS FOR A VEHICLE BRAKE SYSTEM

BACKGROUND OF THE INVENTION

The invention relates to an anti-skid apparatus as defined hereinafter. An anti-skid apparatus for a vehicle brake system of this kind is known from German Patent 31 47 149. Because its controllable check valve is disposed between the pressure reservoir and the master brake cylinder, the capacity of this pressure reservoir must suffice to hold such quantities of pressure fluid as must be withdrawn from the at least one wheel brake for approximately complete reduction of brake pressure generated in a panic braking situation. A pressure reservoir having this kind of capacity is large and therefore is heavy and expensive. If the pressure reservoir is not large enough, then there is the disadvantage that the return pump will generate impermissibly high pressures, if large quantities of pressure fluid must be withdrawn from the wheel brakes. German Patent 31 47 149 describes the usability of the generic anti-skid apparatus in two-tracked vehicles, such as passenger cars and one-tracked motor vehicles, such as motorcycles. The disposition of the controllable check valves has the effect that pressure oscillations occurring in anti-skid operation are kept away from the master brake cylinder and the brake pedal coupled with it.

German Offenlegungsschrift 31 07 963, to which the aforementioned German Patent 31 47 149 refers, discloses anti-skid apparatus for vehicle brake systems, each having one check valve that is located between the master brake cylinder and the anti-skid valve assembly and can be opened in the direction of this valve assembly, and alternatively has a pressure reservoir downstream of the outlet of the return pump, or a controllable pressure limiting valve between the outlet of the return pump and its inlet. The alternative having the pressure reservoir has the disadvantage already mentioned. The alternative having the controllable pressure limiting valve has the disadvantage that it requires a very large hydraulic vessel with a volumetric capacity equivalent to that of the pressure reservoir already described. Another disadvantage is that failure of the return pump causes the brake pedal to sag deeply in the event of anti-skid operation.

An anti-skid apparatus known from U.S. Pat. No. 4,703,979 has a pressure limiting device loaded by a spring assembly in the closing position, which is connected by its inlet to the outlet of the return pump and by its outlet to a main line that begins at the master brake cylinder and leads to anti-skid valve assemblies of the wheel brakes. The pressure of the pressure limiting valve assembly is in equilibrium with the pressure prevailing in the main line. The disadvantage is that because of the absence of a pressure reservoir that could be supplied from the return pump, a safety bypass valve is disposed between the outlet of the return pump and its inlet; this valve has a relatively high opening pressure and therefore places a large load on the return pump and entails major energy consumption. Moreover, this anti-skid apparatus is very complicated in general and is therefore especially expensive.

OBJECT AND SUMMARY OF THE INVENTION

The anti-skid apparatus according to the invention has the advantage that the pressure reservoir can be made smaller and therefore lighter in weight and less expensive than in the anti-skid apparatus of the prior art.

The characteristics set forth herein have an advantage that a pressure reservoir piston, which is conventional in any case, serves as a control element for the pressure limiting device. As a result, components, in particular seals, that can be sources of problems are avoided. Further characteristics define an embodiment of the pressure limiting device that is particularly reliable in operation.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
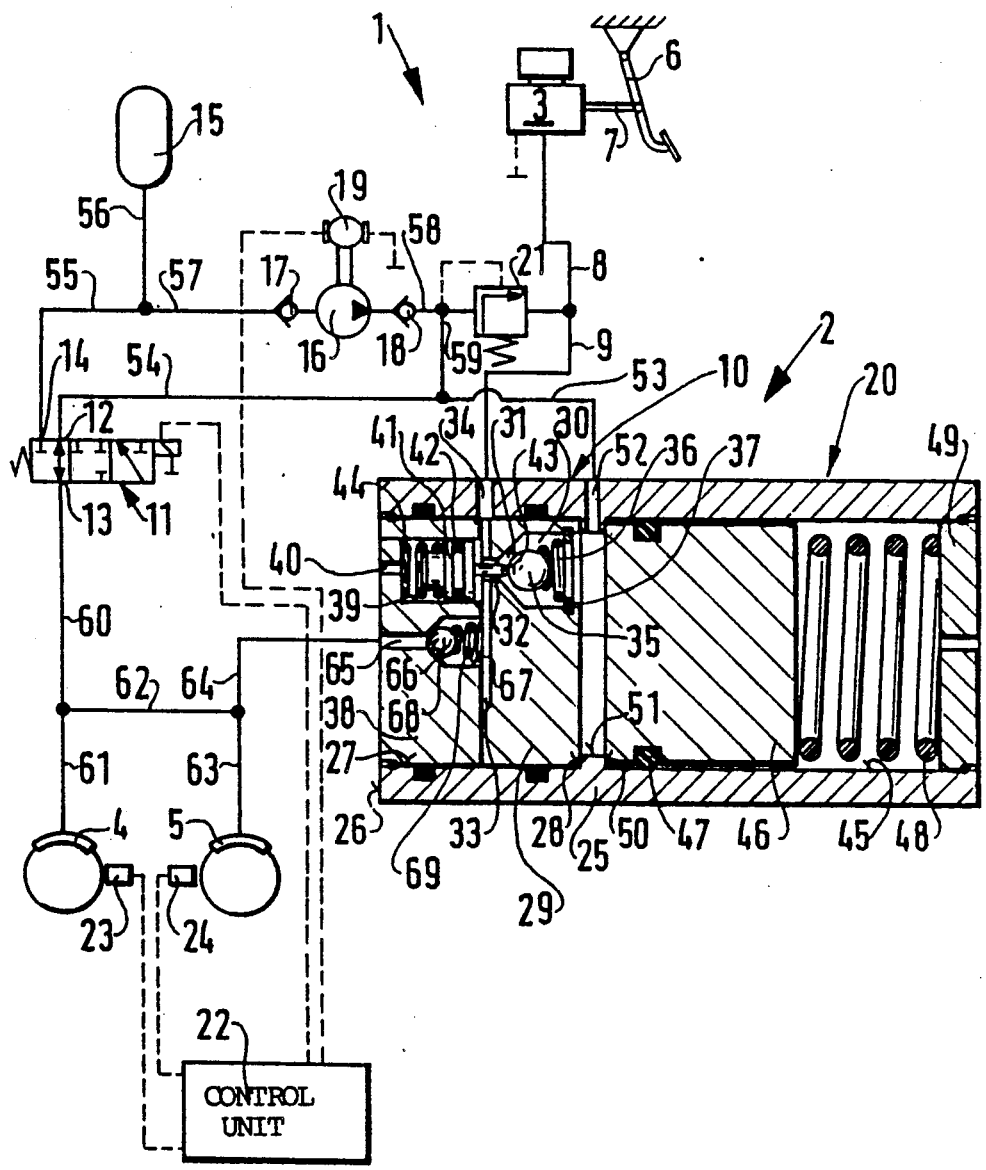
FIG. 1 shows a first exemplary embodiment of the anti-skid apparatus according to the invention, having a separately disposed pressure limiting device, shown in a schematic view.

The anti-skid apparatus 2 according to the invention and as shown in FIG. 1 is installed between a master brake cylinder 3 and wheel brakes 4, 5 of a vehicle brake system 1. This vehicle brake system 1 is for instance a component of a passenger car and is controllable by means of a brake pedal 6, which acts upon the master brake cylinder 3 via a pedal rod 7. The master brake cylinder 3 is preferably embodied as a dual-circuit master brake cylinder. A booster, for instance a pneumatic brake booster (not shown), may be provided to aid the driver, who acts upon the master brake cylinder 3 via the brake pedal 6. Of this vehicle brake system 1, only one brake circuit with an anti-skid apparatus 2 is shown and described here, for the sake of simplification.

The anti-skid apparatus 2 is connected to the master brake cylinder 3 via segments 8, 9 of a master brake line and has a controllable check valve 10; an anti-skid valve assembly 11 having an inlet 12, a first outlet 13 and a second outlet 14; a hydraulic container 15; a return pump 16 having one inlet 17 and one outlet 18 and a drive motor 19; for driving the return pump; a pressure reservoir 20; a pressure limiting device 21; and a control unit 22, to which wheel rotation sensors 23 and 24 associated with the wheel brakes 4 and 5 are electrically connected.

The controllable check valve 10 and the pressure reservoir 20 are accommodated in a common housing 25. A cylindrical bore 27 begins at one end 26 of the housing 25 and ends at a shoulder 28. A first bottom 29, which rests against the shoulder 28, is inserted into the cylindrical bore 27. This bottom 29 has a valve chamber 30, open toward the shoulder 28, with a conical valve seat 31 adjoining it. The valve seat 31 is adjoined by a valve port 32. Extending transversely to the valve port 32 is a groove 33, which leads to a connecting bore 34 located in the housing 25. Located in the valve chamber 30 are a valve element 35, embodied in the form of a ball, and a closing spring 36, which urges the valve element 35 toward the valve seat 31 and is supported on a snap ring 37, which is disposed stationary inside the valve chamber 30. Resting on the first bottom 29, a second bottom 38 is inserted into the cylindrical bore 27. This second bottom 38 has a cylindrical bore 39 beginning on its side toward the first bottom 29 and aligned coaxially with the valve port 32. This cylindrical bore 39 is essentially in the form of a blind bore. A hole 40 serves to ventilate or bleed the cylindrical bore 39. A control piston 41 is displaceably inserted into the cylindrical bore 39 and carries a sealing ring 42 contacting the cylindrical bore 39. The control piston 41 has an opening tappet 43, which extends through the valve portion 32 toward the valve element 35. Also inserted into the cylindrical bore 39 is a restoring spring 44, which urges the control piston 41 in the direction of the first bottom 29. The restoring spring 44 is embodied such that it is capable of overcoming the force of the closing spring 36. As a consequence, the alignment of the valve element 35 shown, spaced apart from the valve seat 31, is equivalent to the basic position. The connection bore 34 communicates with the segment 9 of the main brake line that in turn can be supplied via the segment 9 of the main brake line with brake pressure from the master brake cylinder 3.

The pressure reservoir 20 is formed by a cylindrical bore 45 in the housing 25, a piston 46 is displaceable in this bore and carries a seal 47 which rests tightly against the cylindrical bore 45, and an energy-storing spring 48, which is supported on an end cap 49 secured to the housing 25 urges the piston 46 in the direction of the first bottom 29; the piston 46 is capable of contacting a second shoulder 50 located near the shoulder 28. There is an opening 51 between the two shoulders 28 and 50, which creates a hydraulic connection between the valve chamber 30 and the cylindrical bore 45. A connection bore 52 extends transversely away from the opening 51.

A line 53 begins at the connection bore 52 and is continued by a line 54. The line 54 ends at the inlet 12 of the anti-skid valve assembly 11. A line 55 begins at the second outlet 14 of this anti-skid valve assembly 11 and communicates via a line 56 with the hydraulic container 15 and via a further line 57 with a one-way valve 17 that is connected to the inlet of the return pump 16. A line 58 begins at a one-way valve 18 which is connected to the outlet of the return pump 16, and the pressure limiting device 21 and, via a further line 59, the lines 53 and 54 already mentioned are all connected to this line 58. Beginning at the first outlet 13 of the anti-skid valve assembly 11 is a brake line 60, to which the wheel brake 4, via a further line 61, and the wheel brake 6, via further lines 62 and 63, are connected. A line 64 begins at the line 62 and leads to a connection bore 65, which is located in the bottom 38 of the reservoir 20. The connection bore 65 discharges into a valve seat 66, which in turn discharges into a valve chamber 67 via valve 68. A valve ball 68, which can be pressed against the valve seat 66 by means of a closing spring 69, is located in the valve chamber 67. The valve chamber 67 is opened toward the groove 33, so that this valve chamber 33 communicates hydraulically with the master brake cylinder 3 via the segments 8, 9 of the master brake lines. The valve seat 66 and the valve ball 68, along with the closing spring 69, form a check valve, which opens in the direction toward the master brake cylinder 3 at a pressure drop of 0.5 bar to 1 bar, for example. Accordingly, at most a residual pressure can prevail in the wheel brakes 4 and 5 when the brake pedal 6 is released. A complete reduction of brake pressures to atmospheric pressure is normally effected by the anti-skid valve assembly 11 and the controllable check valve 10.

The wheel rotation sensors 23 and 24 can be taken from the prior art, for example, and serve to output rotational angle signals of wheels (not shown) associated with the wheel brakes 4 and 5. The control unit 22 is arranged and/or programmed for evaluating rotational angle signals from the wheel rotation sensors 23 and 24, for the sake of recognizing incipient danger of wheel locking or skidding, and as a function of this recognition setting the drive motor 19 of the return pump 16 into operation and controlling the anti-skid valve assembly 1 from its basic position to a brake pressure holding position or a brake pressure reduction position.

The mode of operation of the anti-skid apparatus 2 is as follows:

If during braking controlled by means of the brake pedal 6, the brake pressure in the wheel brakes 4 and 5 begins to increase, by the expulsion of brake fluid from the master brake cylinder 3 through the segments 8 and 9 of the main brake lines and from there through the connecting bore 34 and the groove 33, the controllable check valve 10, the lines 53 and 54, and the anti-skid valve assembly 11 and the lines 60, 61, 62 and 63, then this brake pressure may cause the danger of wheel locking at the associated wheel, for instance via the wheel brake 4. As a result, characteristically varying successions of rotational angle signals occur, which the wheel rotation sensor 4 reports to the control unit 22. The control unit 22, to avoid the further increase of the danger of wheel locking, directs the anti-skid valve assembly 11 into the aforementioned brake pressure holding position. In this brake pressure holding position, there is no communication between the inlet 12 and the first outlet 13, so that any possibly increasingly forceful actuation of the brake pedal 6 will not cause a rise in brake pressure in the wheel brakes 4 and 5. Once the control unit 22 recognizes that the danger of wheel locking persists or threatens to increase, despite the prevention of a further increase in brake pressure, then the control unit directs the anti-skid valve assembly 11 into the aforementioned brake pressure reduction position.

In this brake pressure reduction position, the anti-skid valve assembly 11 connects the second outlet 14 to the first outlet 13, so that brake fluid can flow out of the wheel brakes 4 and 5 to the hydraulic container 15, through the lines 55 and 56. To this end, the hydraulic container 15 is embodied in a manner known per se, such that it is capable of holding quantities of pressure fluid at a relatively low pressure, for instance in a pressure range from 1 to 3 bar. Brake pressure that was forced into the wheel brakes 4 and 5 can be reduced to the aforementioned low pressure value with the joint aid of the return pump 16, with the intended consequence that the wheel being braked overly forcefully by the wheel brake 4 undergoes sufficient rotational acceleration, even on wet, icy roads, to reduce and finally eliminate the danger of wheel locking, or skidding. Quantities of pressure fluid that flow to the return pump 16, for instance at the low pressure mentioned, from the hydraulic container 15 through the line 57 and the inlet are pumped by the actuated return pump 16 through its outlet and through the lines 59 and 53 to the pressure reservoir 20. The piston 46 of this reservoir is therefore acted upon and is finally displaced counter to the force of the energy-storing spring 48. The pressure fluid collecting in the pressure reservoir 20 in this process is then available for increasing previously reduced brake pressures again in the wheel brakes 4 and 5, by returning the anti-skid valve assembly 11 to its basic position. A pressure increase up to the original brake pressure is possible, on the condition that the storage capacity of the pressure reservoir, which has been selected to be less than in the prior art, is adequate for holding the quantity of pressure fluid that was previously withdrawn from the two wheel brakes 4 and 5.

As already mentioned at the outset, the pressure reservoir 20 is embodied as smaller than in the prior art. If the situation occasionally arises that the quantities of pressure fluid to be withdrawn from the wheel brakes 4 and 5 are very large, for instance because the brake pedal 6 is being actuated in a panic and the vehicle is moving from a roadway with initially very good traction onto wet ice, for instance, then by means of a pressure increase generated by the return pump 16, being a consequence of excessive filling of the pressure reservoir 20, the pressure limiting device 21 can counteract a further pressure increase by allowing quantities of pressure fluid to flow into the segment 9 of the main line and thus back to the master brake cylinder 3. Accordingly, it is apparent that a relatively small pressure reservoir 20, combined with the aforementioned pressure limiting device 21, results in a functionally very capable brake system, by means of which wheel locking can be prevented. After a brake pressure reduction, on the occasion of which quantities of pressure fluid reached the main line through the pressure limiting device 21, it is possible for pressure fluid to flow back out of the master brake cylinder 3 through the controllable check valve 10 if the storage capacity of the pressure reservoir 20 has been exhausted during the re-buildup of brake pressure. Only the force of the closing spring 36, which can be embodied as relatively weak, needs to be overcome in this process. During anti-skid operation, no pressure fluid can flow out of the pressure reservoir 20 to the master cylinder 3 through the controllable check valve 10 because the control piston 41 is exposed to the pressure of the master brake cylinder 3, and consequently compresses the restoring spring 44 and as a result pulls the opening tappet 43 away from the valve closing body 35. The valve closing body 35 therefore rests sealingly against the valve seat 31. The size of the pressure reservoir 20 is advantageously selected such that in anti-skid operation, on a roadway of constant traction, the variations in brake pressure in the wheel brake that occur continuously during anti-skid operation only coincidentally cause the opening of the pressure limiting device 21. The brake pressure variations may for instance be in the range of 10 bar.

Blocking states of the particular wheel to which the wheel brake 5 and wheel rotation sensor 24 are assigned can be avoided in the same manner.

The pressure limiting device 21 may for instance comprise a conventional commercially available valve, in which a hydraulic action of a closing device, for instance comprising a spring, at a desired pressure level is adequate to overcome the force of this closing device. The pressure limiting device 21 may be embodied as a seat valve, which has hydraulic axial force compensation.

Figure 2:
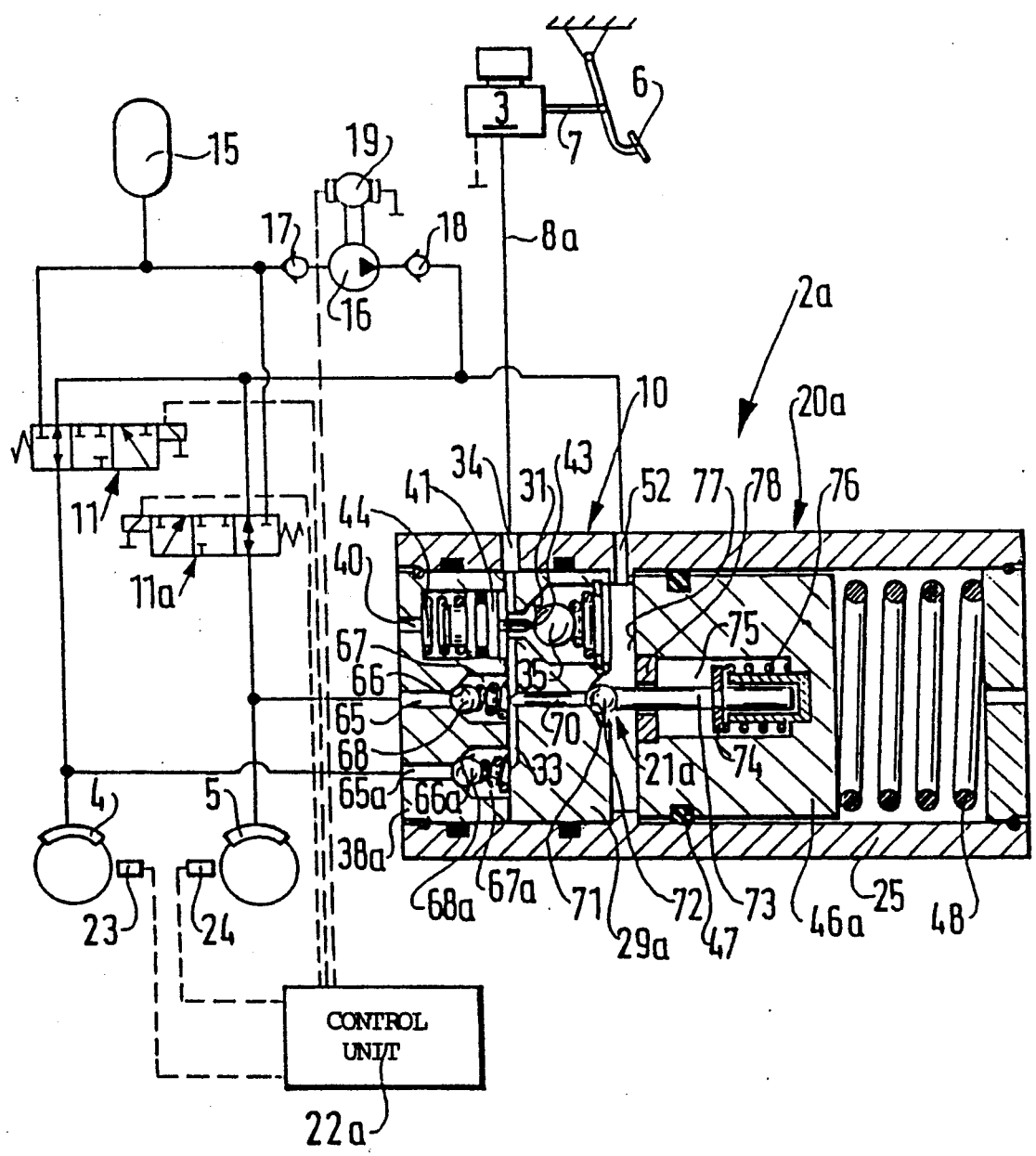
FIG. 2 shows a second exemplary embodiment partially in section of the anti-skid apparatus according to the invention, having a pressure limiting device controllable by a pressure reservoir, for installation in passenger vehicles, for example.

In the exemplary embodiment of a vehicle brake system 1a of FIG. 2, an anti-skid apparatus 2a communicates with the wheel brakes 4 and 5 via two anti-skid valve assemblies 11 and 11a which are controllable independently of one another, so that the brake pressures in these wheel brakes 4 and 5 are separately adjustable to prevent the looking of the respectively associated wheel. For this purpose, the control unit 22a is further embodied, as compared with the first exemplary embodiment, in such a way that it can evaluate successions of rotary angle signals from the wheel rotation signals 23 and 24 independently of one another and as needed can trigger the associated anti-skid valve assembly 11 or 11a. Logically, the motor 19 of the return pump 16 is also switched on by the control unit 22a as needed. Since the wheel brakes 4 and 5 can be supplied with brake pressures independently of one another, it should also be possible to relieve them, down to residual pressures, independently of one another. For this purpose, the connection bore 65 already shown in FIG. 1 is associated with the wheel brake 5, leading to the valve seat 66 and its valve ball 68. Analogously, there is communication between the wheel brake 4 and a second connection bore 65a, which is adjoined by a further valve seat 66a, which can be closed by means of a second valve ball 68a. Since a second valve chamber 67a must be provided for this purpose, a second bottom, which holds both valve chambers 67 and 67a, is shown at 38a.

A further distinction between the exemplary embodiment 2a of FIG. 2 and that of the exemplary embodiment of FIG. 1 is that the pressure limiting device, connected in FIG. 1 directly to the outlet 18 of the return pump 16, is now embodied as a pressure limiting device 21a accommodated inside the housing 25. To this end, a conduit 70 is disposed in a first bottom 29a, beginning at its groove 33; the conduit is aligned longitudinally of the piston 46a and ends at a valve seat 71. A closing element 72, for instance in the form of a ball, is associated with this valve seat 71. A control rod 73, which has a flange-like stop 74, is secured to this closing element 72. The stop 74 is disposed movably inside a chamber 75, which is located inside the piston 46a and is embodied as a blind bore. Adjoining the stop 7 and located in the direction of the energy-storing spring 48 is a closing spring 76, which urges the stop 74 in the direction of the valve seat 71. A stop ring 78 through which the control rod 73 movably extends is secured to the end 77 of the piston 46a oriented toward the bottom 29a. The position of the piston 46a shown is its basic position. In this basic position, the closing spring 76, via the control rod 73, causes the closing element 72 to be pressed against the valve seat 71 and prevents a passage of pressure fluid, pumped by the return pump 16, to the master brake cylinder 3.

If pressure fluid is supplied to the return pump 16 during the anti-skid operation, by means of the anti-skid valve assembly 11 and/or 11a, then this pressure fluid fills the pressure reservoir 20a. In this process the piston 46a is displaced counter to the force of the energy-storing spring 48. Because of the built-in prestressing of the closing spring 76, the closing element 72 initially remains on the valve seat 71 during this process. Finally, once the return pump 16 has displaced the piston 46a far enough that the stop ring 78 reaches the stop 74, then upon further displacement of the piston 46a counter to the spring 48 the control rod 73 pushes the closing element 72 away from its valve seat 71, so that pressure fluid can now flow, out through the conduit 70 and the groove 33, the connection bore 34 and the main line 8a to the master brake cylinder 3. Accordingly, it can be seen that provision is made for a pressure reservoir 20a not to lead to any pressure overload of the return pump 16 or pressure reservoir 20a, despite the small capacity of this reservoir. The exemplary embodiment of FIG. 2 has the advantage that by accommodating the pressure limiting device 21a inside the piston 46a and the bottom 29a, less space is needed and hence less expense for lines and conduits.

Unlike the control unit 22 of FIG. 1, which is arranged for the collective regulation of brake pressure in two wheel brakes 4, 5 by means of only one anti-skid valve assembly 11, the control unit 22a of the second exemplary embodiment 2a of FIG. 2 is further embodied for independent evaluation of wheel rotation signals from the two wheel rotation sensors 23 and 24 and for triggering of the anti-skid valve arrangements 11 and 11a independently of one another. This further feature enables so-called individual regulation of the wheel brakes of one axle, or of wheel brakes assigned to two vehicle axles.

Figure 3:
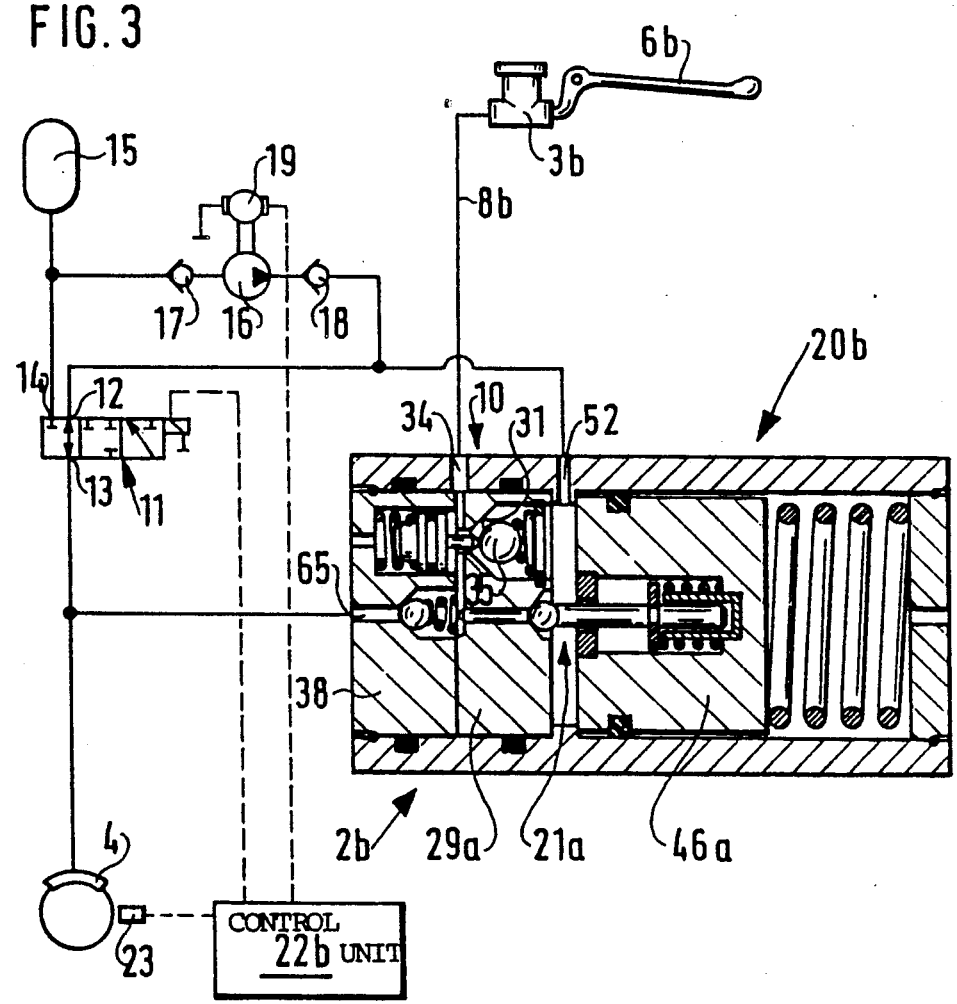
FIGS. 3 and 4 show anti-skid apparatus according to the invention in motorcycle brake systems.

FIG. 3 shows an anti-skid apparatus 2b, which is intended for the front wheel brake circuit of a motorcycle. To this end, the master brake cylinder 3b is actuated by a hand lever 6b, instead of a brake pedal. A main brake line 8b leads from this master brake cylinder 3b to the connection bore 34 of the anti-skid apparatus 2b. This anti-skid apparatus 2b contains the second bottom 38 of the exemplary embodiment of FIG. 1, along with the pressure limiting device 21a and piston 46a of the second embodiment of FIG. 2. Since only one wheel brake 4 needs to be supplied via the main brake line 8b, one anti-skid valve assembly as already described suffices, and as needed supplies pressure fluid from the wheel brake 4 to a hydraulic container 15 and finally to the return pump 16. Since only one wheel rotation sensor 23 is required in this front wheel brake circuit, the control unit 22b can be embodied more simply than the control units 22 and 22a. The basic function of the control unit 22b with respect to the one wheel rotation sensor 23 and the merely single anti-skid valve arrangement 11 is analogous to that of the control unit 22 already described.

Figure 4:
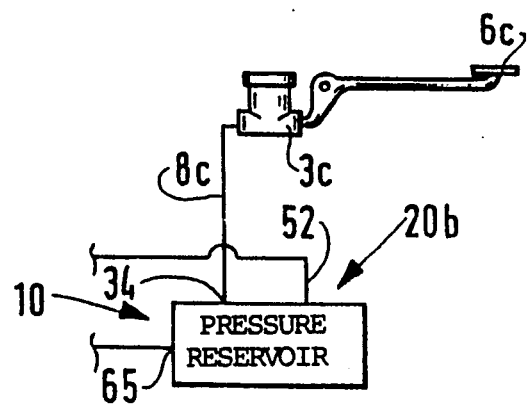

FIG. 4 shows the further use of the anti-skid apparatus 2b or a master brake cylinder 3c, actuated by a brake pedal 6c of a rear wheel brake circuit of a motorcycle. Accordingly, a main brake line 8c beginning at the master brake cylinder 3c supplies a rear wheel brake, via the connection 52.

As can be understood from FIGS. 1–4, the characteristics according to the invention of an anti-skid apparatus can be used in different kinds of brake systems. Further description in terms of the association of an anti-skid apparatus with the second circuit of the master brake cylinder of FIGS. 1 and 2 is accordingly unnecessary. It is also within the professional competence of one skilled in the art of brake systems, instead of associating one anti-skid apparatus with the brakes of a single axle, to associate a front wheel of one axle with one anti-skid apparatus and a rear wheel of the other axle with another. It should merely be noted that in the exemplary embodiment of FIG. 1, one of the two wheel rotation sensors can be dispensed with if the remaining wheel rotation signal is for instance disposed on a differential gear, by which the wheels associated with the wheel brakes 4 and 5 can both be driven.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An anti-skid apparatus between a master brake cylinder and at least one wheel brake of a vehicle brake system, having a common housing (25), a controllable check valve (10) and a pressure reservoir (20) in said common housing, said controllable check valve having a first inlet connected to a first outlet of the master brake cylinder, said controllable check valve is controllably closable and after that openable by a pressure drop from the master brake cylinder to the at least one wheel brake; at least one anti-skid valve assembly, said at least one anti-skid valve assembly has a second inlet connected to a connection bore (52) of the controllable check valve and a second outlet, said second outlet communicates with the at least one wheel brake, and a third outlet connectable within said at least one anti-skid valve assembly to the second outlet; a hydraulic container (15) which is connected to the third outlet; a return pump which has a pump inlet communicating with the hydraulic container and a pump outlet connected to the second inlet of the anti-skid valve assembly, to said connection bore (52) and to said pressure reservoir in said common housing which communicates with the pump outlet of the return pump; a control unit at least for controlling the anti-skid valve assembly; and said pump outlet of the return pump communicates with the master brake cylinder via a pressure limiting device that is opened toward said master brake cylinder to return fluid back to said master brake cylinder.

2. The anti-skid apparatus as defined in claim 1, in which the pressure limiting device (21a) is within said common housing and includes a valve with a movable valve element (72) which is coupled via a closing device (73, 74, 76, 78) with a piston (46a) that is a component of the pressure reservoir (20a) and is loaded by means of an energy-storing spring (48).

3. The anti-skid apparatus as defined by claim 2, in which the valve of the pressure limiting device (21, 21a) is embodied as a valve having a valve seat (71) and a closing element (72).

4. The anti-skid apparatus as defined in claim 3, in which the closing element (72) is coupled to the closing device (74, 78) via a control rod (73), and that a closing spring (76) which acts upon the closing element (72) via the control rod (73), is associated with the closing device.

* * * * *